US009756878B2

(12) United States Patent
Liu

(10) Patent No.: US 9,756,878 B2
(45) Date of Patent: Sep. 12, 2017

(54) ELECTRONIC CIGARETTE AND ATOMIZATION CONTROL METHOD THEREOF

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen, Guangdong (CN)

( * ) Notice: Subject to any disclaimer, the term of this patent is extended or adjusted under 35 U.S.C. 154(b) by 0 days.

(21) Appl. No.: 15/346,421

(22) Filed: Nov. 8, 2016

(65) Prior Publication Data

US 2017/0049155 A1 Feb. 23, 2017

Related U.S. Application Data

(63) Continuation of application No. PCT/CN2015/075101, filed on Mar. 26, 2015.

(30) Foreign Application Priority Data

Apr. 3, 2014 (CN) .......................... 2014 1 0133757

(51) Int. Cl.
*A24F 47/00* (2006.01)
*G10L 15/22* (2006.01)
*H05B 1/02* (2006.01)

(52) U.S. Cl.
CPC ............ *A24F 47/008* (2013.01); *G10L 15/22* (2013.01); *H05B 1/0244* (2013.01); *H05B 2203/021* (2013.01)

(58) Field of Classification Search
None
See application file for complete search history.

(56) References Cited

U.S. PATENT DOCUMENTS 6,377,820 B1 * 4/2002 Courtis ................ H04M 1/271
379/80
2007/0006889 A1 1/2007 Kobal
(Continued)

FOREIGN PATENT DOCUMENTS

CN        1596775 A    3/2005
CN      202436108 U    9/2012
(Continued)

OTHER PUBLICATIONS

International Search Report for PCT/CN2015/075101, dated Jun. 17, 2015, ISA/CN.

*Primary Examiner* — Michael H Wilson
*Assistant Examiner* — Katherine Will
(74) *Attorney, Agent, or Firm* — Yue Xu; U.S. Fairsky LLP

(57) ABSTRACT

An electronic cigarette and an atomization control method thereof are provided. The electronic cigarette includes a smoking end; a voice recognition module generating different selection signals in response to received voices, an atomization module including first and second atomization components, and first and second liquid storage spaces filled with different cigarette liquid; a microcontroller connected to the voice recognition module, an air flow sensor connected to the microcontroller and generating a first pulse signal; and a battery module. The microcontroller is connected to the first atomization component in response to a first selection signal or connected to the second atomization component in response to a second selection signal, and generates a first control signal in response to the first pulse signal. The atomization component connected to the microcontroller atomizes the cigarette liquid in the liquid storage
(Continued)

space corresponding to the first control signal in response to the first control signal.

12 Claims, 5 Drawing Sheets

(56) References Cited

U.S. PATENT DOCUMENTS

| | | |
|---|---|---|
| 2010/0031968 A1 | 2/2010 | Sheikh et al. |
| 2013/0104916 A1* | 5/2013 | Bellinger ............ A61M 11/041 |
| | | 131/328 |
| 2013/0168880 A1 | 7/2013 | Duke |
| 2013/0192615 A1* | 8/2013 | Tucker ................. H01C 17/00 |
| | | 131/328 |
| 2015/0043117 A1* | 2/2015 | Xiang .................... H02H 3/10 |
| | | 361/91.5 |
| 2015/0053217 A1* | 2/2015 | Steingraber ........... A24F 47/008 |
| | | 131/329 |

FOREIGN PATENT DOCUMENTS

| | | |
|---|---|---|
| CN | 202445135 U | 9/2012 |
| CN | 103054196 A | 4/2013 |
| CN | 103271448 A | 9/2013 |
| CN | 103519351 A | 1/2014 |
| CN | 103859609 A | 6/2014 |
| KR | 20110079590 A | 7/2011 |
| WO | 2014032275 A1 | 3/2014 |
| WO | 2014032276 A1 | 3/2014 |

* cited by examiner

ELECTRONIC CIGARETTE AND ATOMIZATION CONTROL METHOD THEREOF

CROSS REFERENCE TO RELATED APPLICATION

The application is a continuation of International Application No. PCT/CN2015/075101 filed on Mar. 26, 2015, which claims priority to Chinese Patent Application No. 201410133757.8 filed on Apr. 3, 2014, both of which are incorporated herein by reference in their entireties.

FIELD

The present disclosure relates to the technical field of electronic cigarette, and in particular to an electronic cigarette and a method for controlling atomization of the electronic cigarette.

BACKGROUND

An electronic cigarette is a new electronic product, which has the same appearance and taste as that of a common cigarette. However, the electronic cigarette is better for healthy and more environmentally friendly than a conventional cigarette.

The electronic cigarette controls a volume of outputted smog and a working state by means of a high technology silicon chip and a sensor. Cigarette liquid is atomized, i.e., a solution containing nicotine and essence is atomized into particles. The electronic cigarette neither contains tar or other harmful ingredients in a common cigarette, nor generates secondhand smoke.

However, with an existing electronic cigarette, a user can only take in cigarette liquid with only one flavor. In order to take in cigarette liquid with other flavors, the user needs to carry multiple electronic cigarettes with different flavors.

SUMMARY

According to the present disclosure, an electronic cigarette and a method for controlling atomization of an electronic cigarette are provided, to allow a user to select cigarette liquid with different flavors from one electronic cigarette by using a voice.

According to the present disclosure, an electronic cigarette is provided, which includes:
an electronic cigarette body;
a smoking end, a voice recognition module and an atomization module which are provided in the electronic cigarette body, where the voice recognition module is configured to generate different selection signals in response to received voices, the different selection signals include a first selection signal and a second selection signal, the atomization module includes at least a first atomization component and a second atomization component, and a first liquid storage space and a second liquid storage space filled with different cigarette liquid are provided in the first atomization component and the second atomization component respectively;
a microcontroller connected to the voice recognition module and configured to be connected to the first atomization component in response to the first selection signal or connected to the second atomization component in response to the second selection signal; and
an airflow sensor and a battery module which are provided in the electronic cigarette body, where the air flow sensor is connected to the microcontroller and configured to generate a first pulse signal, and the battery module is configured to supply power to the microcontroller, the first atomization component and the second atomization component, where
the microcontroller is further configured to generate a first control signal in response to the first pulse signal, and the atomization component connected to the microcontroller is configured to atomize the cigarette liquid in the liquid storage space corresponding to the first control signal in response to the first control signal.

In the electronic cigarette according to the present disclosure,
the voice recognition module may be further configured to generate a third selection signal in response to the received voice; and
the microcontroller may be further configured to be connected to both the first atomization component and the second atomization component in response to the third selection signal.

In the electronic cigarette according to the present disclosure,
the first atomization component may further include a first heating wire component configured to atomize the cigarette liquid in the first liquid storage space;
the first atomization component may further include a second heating wire component configured to atomize the cigarette liquid in the second liquid storage space; and
two ends of the first liquid storage space are respectively adjacent to two ends of the second liquid storage space, where the first liquid storage space and the second liquid storage space are arranged in a parallel and side by side manner in the electronic cigarette body.

In the electronic cigarette according to the present disclosure,
the first atomization component may further include:
a first atomizer bracket, where a first thread segment is provided at an end of the first atomizer bracket close to the battery module, a first matching thread is provided at an end of the battery module close to the first atomizer bracket, and the first atomizer and the battery module are detachably connected to each other by cooperation between the first thread segment and the first matching thread, and
the first liquid storage space is arranged on the first atomizer bracket;
the second atomizer component may further include:
a second atomizer bracket, where a second thread segment is provided at an end of the second atomizer bracket close to the battery module, a second matching thread is provide at an end of the battery module close to the second atomizer bracket, and the second atomizer and the battery module are detachably connected to each other by cooperation between the second thread segment and the second matching thread, and
the second liquid storage space is arranged on the second atomizer bracket.

In the electronic cigarette according to the present disclosure,
the voice recognition module may include a voice receiver and a voice recognition unit,
the voice receiver is configured to receive a voice signal and convert the received voice signal into an electrical signal; and the voice recognition unit is configured to generate the first selection signal or the second selection signal in response to the electrical signal and transmit the first selection signal or the second selection signal to the microcontroller.

In the electronic cigarette according to the present disclosure, the battery module may further include:

a button configured to receive an operation instruction from a user; and a micro-touch switch connected to the button and configured to generate a starting signal in response to the operation instruction, where the micro-touch switch is connected to the voice receiver to control the voice receiver to receive the voice signal in response to the starting signal.

In the electronic cigarette according to the present disclosure, a low voltage protection module may be further provided in the electronic cigarette body;

a first reminding device connected to the low voltage protection module may be further provided on an external surface of the electronic cigarette body; and the low voltage protection module may be configured to control a working state of the first reminding device.

In the electronic cigarette according to the present disclosure, an overcurrent protection module may be further provided in the electronic cigarette body;

a second reminding device connected to the overcurrent protection module may be further provided on an external surface of the electronic cigarette body; and the overcurrent protection module may be configured to control a working state of the second reminding device.

According to the present disclosure, a method for controlling atomization of an electronic cigarette is further provided, where at least two atomization components are provided in the electronic cigarette, each of the atomization components is provided with a separate liquid storage space filled with different cigarette liquid, and the method includes:

acquiring, by the electronic cigarette, a voice signal;

generating, by the electronic cigarette, a selection signal in response to the voice signal, where different selection signals correspond to different atomization components;

selecting, by the electronic cigarette, the atomization component corresponding to the generated selection signal in response to the generated selection signal; and controlling, by the electronic cigarette, the selected atomization component to work when detecting that an internal pressure of the electronic cigarette changes.

In the method for controlling atomization of an electronic cigarette according to the present disclosure, where the electronic cigarette may include a first atomization component and a second atomization component; and the selecting, by the electronic cigarette, the atomization component corresponding to the generated selection signal in response to the generated selection signal may include:

selecting the first atomization component in a case that the selection signal is a first selection signal;

selecting the second atomization component in a case that the selection signal is a second selection electrical signal; and selecting both the first atomization component and the second atomization component in a case that the selection signal is a third selection electrical signal.

It follows from the above technical solutions that, the embodiments of present disclosure have the following advantages.

At least two atomization components are provided in the electronic cigarette according to the present disclosure, where liquid spaces filled with different cigarette liquid are provided in the respective atomization components. Furthermore, the voice recognition module and the microcontroller connected to each other are further provided on the electronic cigarette, where the voice recognition module transmits different selection signals in response to the received different voices and the microcontroller selects corresponding atomization components to work in response to the different selection signals. In this way, a user can take in the cigarette liquid with different flavors from one electronic cigarette, thereby avoiding inconvenience of carrying multiple electronic cigarettes by the user or assembling inconvenience due to using a complicated mechanical structure. In addition, the user can select the cigarette liquid with different flavors from one electronic cigarette by using a voice, which is convenient and quick, and can greatly reduce a probability of soiling the user by the cigarette liquid leaked onto a surface of the electronic cigarette or taking in leaked cigarette liquid due to replacing the cigarette liquid, thereby improving the user experience.

DETAILED DESCRIPTION

According to the present disclosure, an electronic cigarette is disclosed, to allow a user to select cigarette liquid with different flavors from one electronic cigarette by using a voice.

Hereinafter technical solutions in embodiments of the present disclosure are described clearly and completely in conjunction with the drawings in the embodiments of the present disclosure. Apparently, the described embodiments are only some rather all of the embodiments of the present disclosure. Any other embodiments obtained based on the embodiments in the present disclosure by those skilled in the art without any creative work fall within the scope of protection of the present disclosure.

Figure 1:
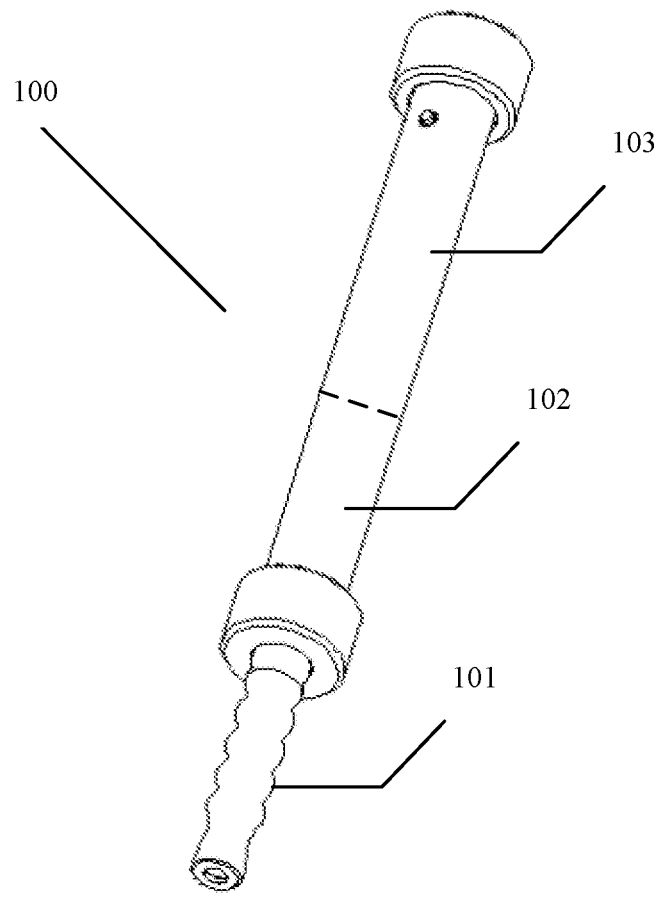
FIG. 1 is a schematic overall structural diagram of an electronic cigarette according to an embodiment of the present disclosure.

Reference is made to FIG. 1 which is a schematic overall structural diagram of an electronic cigarette according to an embodiment of the present disclosure.

In the embodiment, an electronic cigarette 100 includes an electronic cigarette body. A smoking end 101 is provided in the electronic cigarette body. A user can smoke through the smoking end 101.

An atomization module 102 and a battery module 103 are further provided in the electronic cigarette body.

Figure 2:
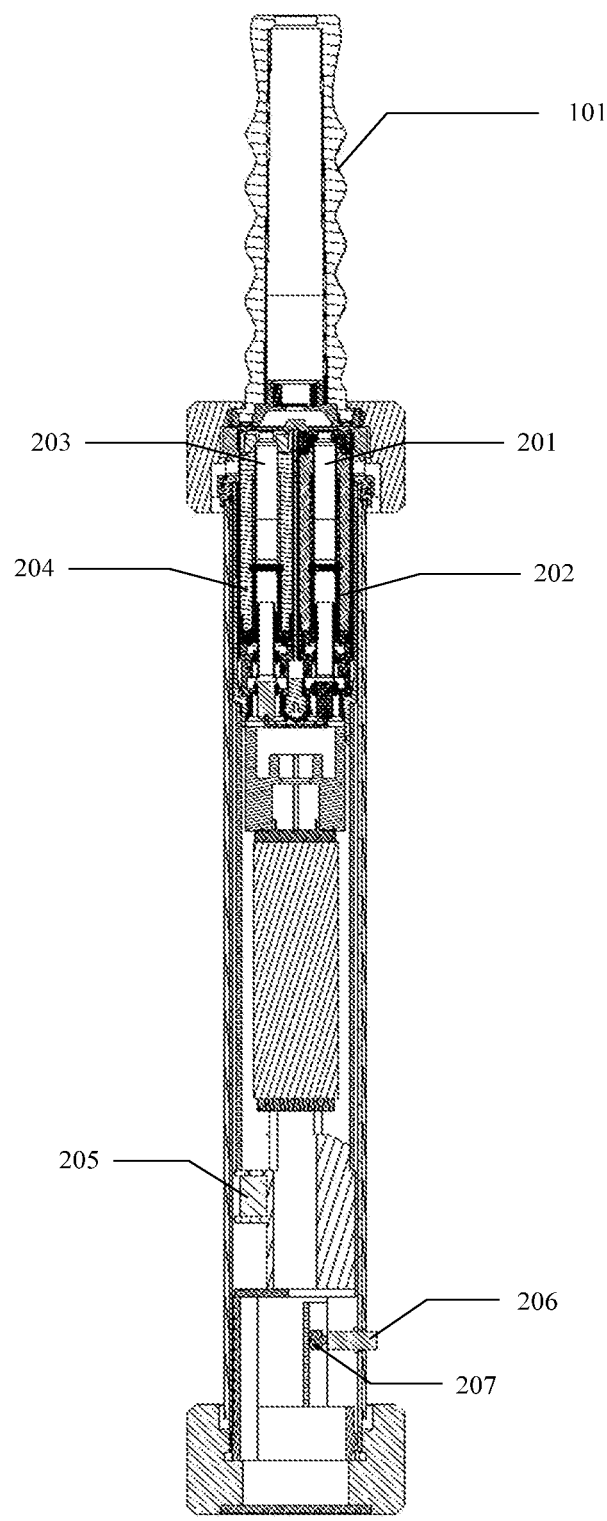
FIG. 2 is a schematic sectional structural diagram of the electronic cigarette shown in FIG. 1.
Figure 3:
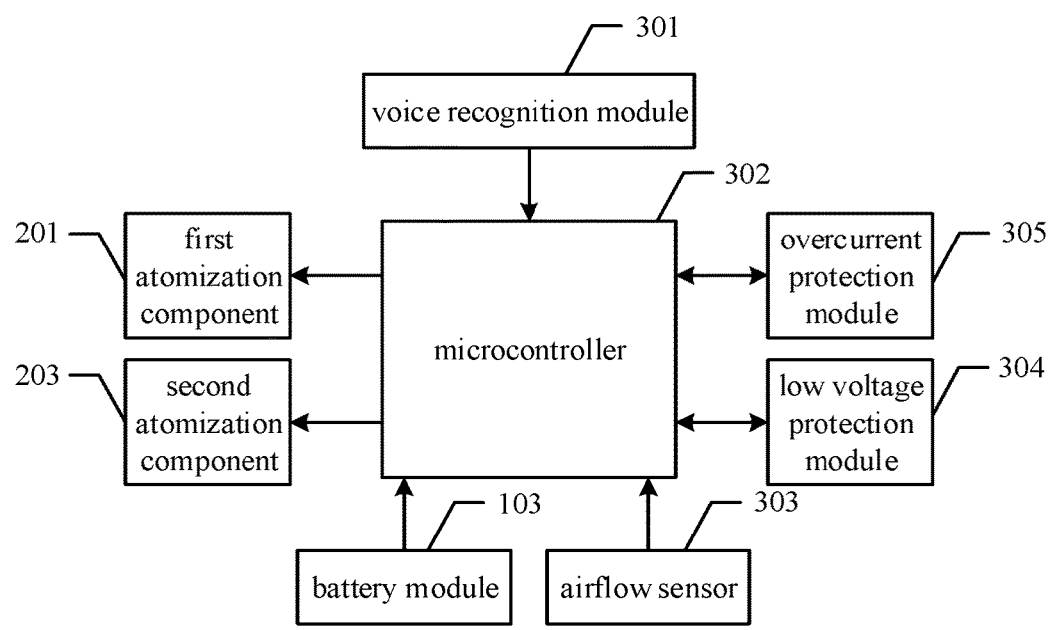
FIG. 3 is a schematic structural diagram of a circuit connection in the electronic cigarette according to an embodiment of the present disclosure.

Reference is made to FIG. 2 and FIG. 3. FIG. 2 is a schematic sectional structural diagram of the electronic cigarette shown FIG. 1. FIG. 3 is a schematic structural diagram of a circuit connection in the electronic cigarette according to an embodiment of the present disclosure.

As shown in FIG. 2 and FIG. 3, a voice recognition module 301 is further provided in the electronic cigarette body and configured to receive a voice and generate different selection signals in response to received voices. The different selection signals include a first selection signal and a second selection signal.

At least two atomization components are provided in the atomization module 102 of the electronic cigarette body, which are a first atomization component 201 and a second atomization component 203 respectively. A first liquid storage space 202 is provided in the first atomization component 201, a second liquid storage space 204 is provided in a second atomization component 203, and the first liquid storage space 202 and the second liquid storage space 204 are filled with different cigarette liquid respectively. Specifically, liquid storage cotton is provided in the first liquid storage space 202 and the second liquid storage space 204. Apparently, in practice, other liquid storage mediums may be provided in the first liquid storage space 202 and the second liquid storage space 204, which is not limited herein.

A microcontroller 302 connected to the voice recognition module 301 is further provided in the electronic cigarette body. In a case that the voice recognition module 301 generates a first selection signal in response to a received voice, the microcontroller 302 is configured to be connected to the first atomization component 201 in response to the first selection signal. In a case that the voice recognition module 301 generates a second selection signal in response to the received voice, the microcontroller 302 is configured to be connected to the second atomization component 203 in response to the second selection signal.

Apparently, in practice, more than two atomization components may be provided in the electronic cigarette body. Accordingly, the voice recognition module 301 may generate more than two selection signals in response to the received voices, where the number of the generated selection signals is equal to the number of atomization components, and there is one-to-one correspondence between the atomization components and the selection signals. Alternatively, the number of selection signals generated in response to the received voices by the voice recognition module 301 may be greater than the number of atomization components, such that each of extra selection signals corresponds to at least two atomization components. The microcontroller 302 is configured to be connected to, in response to selection signals generated by the voice recognition module 301, the atomization components corresponding to the selection signals.

An airflow sensor 303 is further provided in the electronic cigarette body, which is connected to the microcontroller 302 and configured to generate a first pulse signal. The airflow sensor generates a pulse signal when detecting that a pressure in a smog passage in the electronic cigarette body becomes lower, i.e., when a user smokes. Preferably, the airflow sensor 303 is arranged at a position close to the smoking end to improve a sensibility of sensing a smoking action of the user by the airflow sensor 303, thereby enabling the user to use the electronic cigarette more efficiently.

The battery module 103 is configured to supply power to the microcontroller 302, the airflow sensor 303, the first atomization component 201 and the second atomization component 203.

The microcontroller is further configured to receive the first pulse signal generated by the airflow sensor 303, and generate a first control signal in response to the first pulse signal. The atomization component connected to the microcontroller controls the cigarette liquid in the liquid storage space provided in the atomization component to be atomized in response to the first control signal.

For example, in a case that the voice recognition module 301 generates a first selection signal in response to a received voice, the microcontroller 302 is configured to be connected to the first atomization component 201 in response to the first selection signal. The microcontroller 302 is further configured to generate a first control signal when receiving the first pulse signal from the airflow sensor 303. The first atomization component 201 connected to the microcontroller 302 controls the cigarette liquid in the first liquid storage space to be atomized in response to the first control signal.

In a case that the voice recognition module 301 generates a second selection signal in response to the received voice, the microcontroller 302 is configured to be connected to the second atomization component 203 in response to the second selection signal. The microcontroller 302 is further configured to generate the first control signal when receiving the first pulse signal from the airflow sensor 303. The second atomization component 203 connected to the microcontroller 302 controls the cigarette liquid in the second liquid storage space to be atomized in response to the first control signal.

Preferably, the voice recognition module 301 may further generate a third selection signal in response to the received voice, and the microcontroller 302 is further configured to be connected to both the first atomization component 201 and the second atomization component 203 in response to the third selection signal. The microcontroller 302 is further configured to generate the first control signal when receiving the first pulse signal from the airflow sensor 303. The first atomization component 201 connected to the microcontroller 302 controls the cigarette liquid in the first liquid storage space to be atomized in response to the first control signal, and the second atomization component 203 connected to the microcontroller 302 controls the cigarette liquid in the second liquid storage space to be atomized in response to the first control signal. In this way, the user can take in mixed smog generated by atomizing two types of different cigarette liquid simultaneously, thereby providing smog with a third flavor for the user. Apparently, in practice, the voice recognition module 301 may not generate the third selection signal. The above contents are only exemplary and are not intended to limit.

A smog passage is provided in the electronic cigarette body for the atomized cigarette liquid to flow, to enable the user to take in the cigarette liquid flowing through the smog passage with the smoking end 101.

In the embodiment of the present disclosure, at least two atomization components are provided in the electronic cigarette body, where liquid spaces filled with different cigarette liquid are provided in different atomization components. Furthermore, the voice recognition module and the microcontroller connected to each other are further provided on the electronic cigarette, where the voice recognition module transmits different selection signals in response to the received different voices, and the microcontroller selects corresponding atomization components to work in response to the different selection signals. In this way, the user can take in cigarette liquid with different flavors from one electronic cigarette, thereby avoiding inconvenience of carrying multiple electronic cigarettes by the user. In addition, the user can select the cigarette liquid with different flavors from one electronic cigarette by using a voice, which is convenient and quick, thereby improving the user experience.

Figure 4:
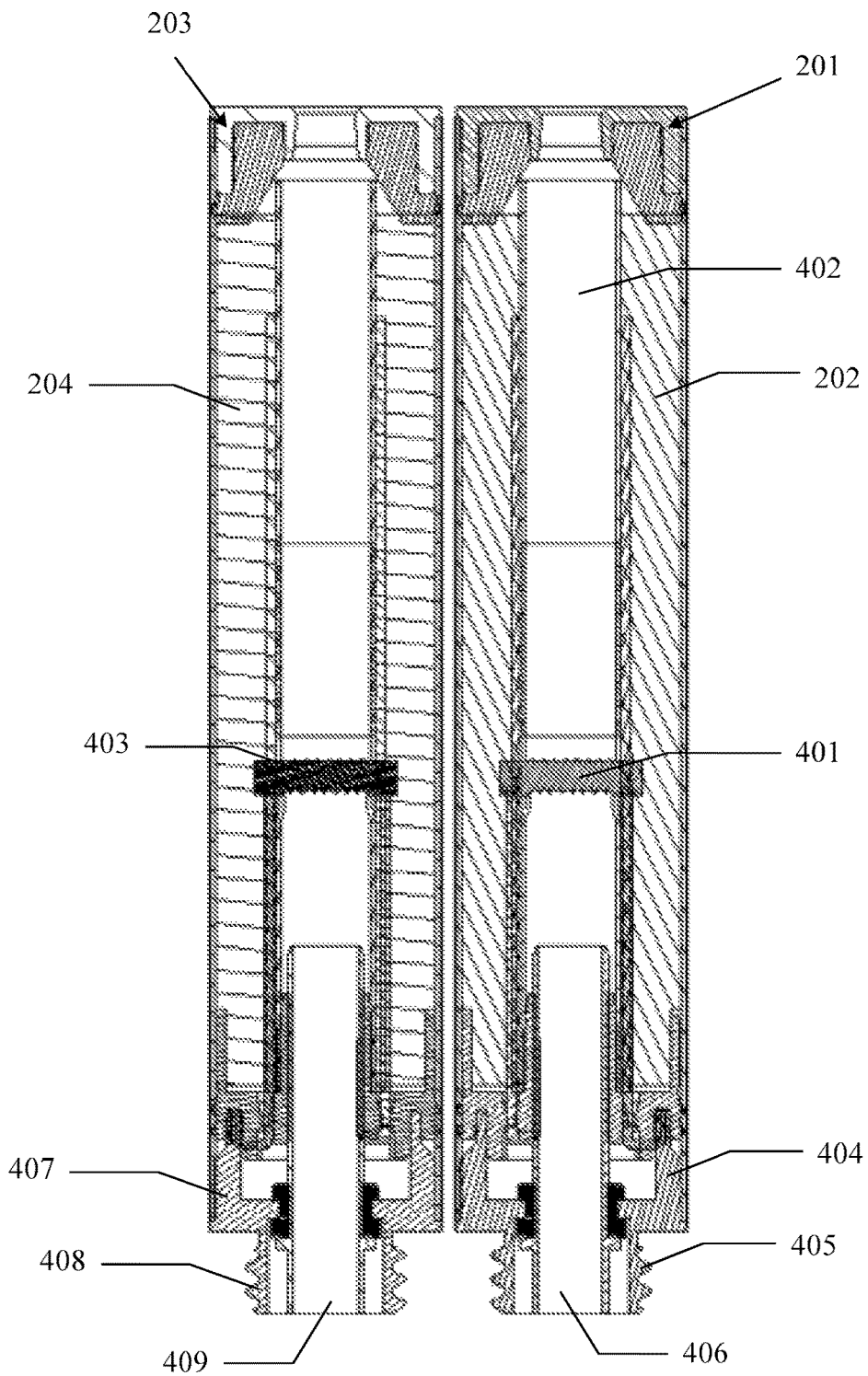
FIG. 4 is a schematic sectional structural diagram of an atomization module in the electronic cigarette shown in FIG. 1 according to an embodiment.

In the present disclosure, the atomization components in the atomization module 102 in the electronic cigarette body can be implemented in multiple structures. Hereinafter a specific structure of an atomization module of the electronic cigarette is described in detail in conjunction with FIG. 4. Reference is made to FIG. 4 which is a schematic sectional structural diagram of an atomization module in the electronic cigarette shown in FIG. 1 according to an embodiment.

The atomization module 102 includes a first atomization component 201 including a first heating wire component 401 and a second atomization component 203 including a second heating wire component 403.

The first heating wire component 401 of the first atomization component 201 is configured to atomize cigarette liquid in the first liquid storage space 202. Specifically, in the embodiment, the first liquid storage space 202 is around a hollow first PVC silicone fiberglass sleeving 402, a through hole is provided on the first PVC silicone fiberglass sleeving 402, and an extension direction of the through hole is perpendicular to an extension direction of the first PVC silicone fiberglass sleeving 402, such that the first heating wire component 401 can pass through the through hole and be fixed with the first heating wire component 401. In addition, both ends of the first heating wire component 401 are inserted into the first liquid storage space 202, so as to atomize the cigarette liquid in the first liquid storage space 202. Apparently, in practice, the first liquid storage space and the first heating wire component in the first atomization component may be arranged in other ways, which is not limited herein.

The second atomization component 203 has the same structure as that of the first atomization component 201. Alternatively, in practice, the second atomization component 203 may have a different structure from that of the first atomization component 201, and the second liquid storage space 204 and the second heating wire component 403 in the second atomization component 203 may have other structures, which is not limited herein.

The first liquid storage space 202 and the second liquid storage space 204 are arranged in a parallel and side by side manner in the electronic cigarette body. Two ends of the first liquid storage space 202 are respectively adjacent to two ends of the second liquid storage space 204, such that the first atomization component 201 and the second atomization component 203 are arranged in a parallel side by side in the electronic cigarette body. Furthermore, one end of each of the two atomization components is adjacent to the battery module 103.

In the embodiment, by arranging the atomization components in the atomization module 102 as above, the internal structure of the atomization module 102 is compact, thereby reducing a volume of the electronic cigarette body.

Preferably, in the embodiment, the first atomization component 201 further includes a first atomizer bracket 404, and the first liquid storage space 202 is arranged on the first atomizer bracket 404. A first thread segment 405 configured to detachably connect to the battery module 103 is provided at an end of the first atomizer bracket 404 close to the battery module 103. Specifically, the first thread segment 405 is an external thread. Accordingly, a first matching thread is provided at an end of the battery module 103 close to the first atomizer bracket 404, such that the first atomizer bracket 404 and the battery module 103 are detachably connected to each other by cooperation between the first thread segment 405 and the first matching thread. Specifically, the first matching thread is an internal thread. Apparently, in practice, the first thread segment may be an internal thread and the first matching thread may be an external thread, which is not limited herein.

Furthermore, a first atomizer electrode 406 is further provided fixedly in the first thread segment 405 on the first atomizer bracket 404. When the first atomization component 201 is connected to the battery module 103 through the thread, the first atomizer electrode 406 is connected to a battery electrode in the battery module 103, such that the battery module 103 can supply power to the first atomization component 201 when the microcontroller is connected to the first atomization component 201.

Similarly, the second atomization component 203 further includes a second atomizer bracket 407, and the second liquid storage space 204 is arranged on the second atomizer bracket 407. A second thread segment 408 configured to detachably connect to the battery module 103 is provided at an end of the second atomizer bracket 407 close to the battery module 103. Specifically, the second thread segment 408 is an external thread. Accordingly, a second matching thread is provided at an end of the battery module 103 close to the second atomizer bracket 407, such that the second atomizer bracket 407 and the battery module 103 are detachably connected to each other by cooperation between the second thread segment 408 and the second matching thread. Specifically, the second matching thread is an internal thread. Apparently, in practice, the second thread segment may be an internal thread and the second matching thread may be an external thread, which is not limited herein.

Furthermore, a second atomizer electrode 409 is further provided fixedly in the second thread segment 408 on the second atomizer bracket 407. When the second atomization component 203 is connected to the battery module 103 through the thread, the second atomizer electrode 407 is connected to a battery electrode in the battery module 103, such that the battery module 103 can supply power to the second atomization component 203 when the microcontroller 302 is connected to the second atomization component 203.

In this way, the first atomization component and the second atomization component are detachably connected to the battery module 103 through the thread segments respectively, so as to facilitate the user replacing the atomization components.

The above atomization components are described to be connected to the battery module through the thread as an example. In practice, the atomization components may be connected to the battery module in other detachable ways, such as snap connection. In this case, a connection structure on the atomizer bracket is not a thread segment but an elastic snap spring plate. Apparently, the above contents are only exemplary and are not intended to limit. Alternatively, the atomization components may even be connected to the battery module in a non-detachable manner, which is not limited herein.

Figure 5:
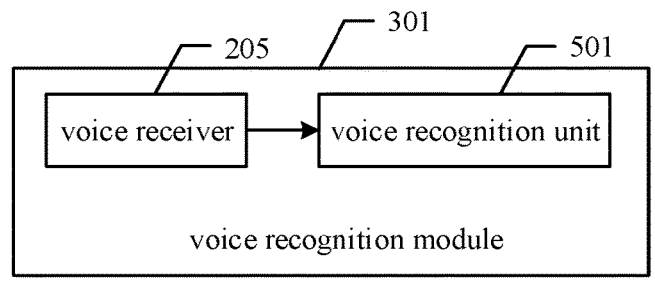
FIG. 5 is a schematic diagram of a voice recognition module in the electronic cigarette shown in FIG. 1 according to an embodiment.

In the present disclosure, the voice recognition module 301 in the electronic cigarette body can be implemented in multiple ways. Hereinafter a specific implementation of the voice recognition module 301 of the electronic cigarette is described in detail in conjunction with FIG. 5. Reference is made to FIG. 5 which is a schematic diagram of the voice recognition module 301 of the electronic cigarette shown in FIG. 1 according to an embodiment.

As shown in FIG. 5, the voice recognition module 301 includes a voice receiver 205 (see FIG. 2) and a voice recognition unit 501.

The voice receiver 205 is configured to receive a voice signal and convert the received voice signal into an electrical signal. For example, the voice receiver may be a mouthpiece. Apparently, the above example is only illustrative and is not intended to limit. Specifically, the voice receiver 205 may be located at an end of the batter module 103 away from the atomization component 102 (see FIG. 2) and is electrically connected to a battery in the battery module 103. Apparently, the above is only an example of the position of the voice receiver 205, which is not intended to limit.

The voice recognition unit 501 is configured to generate the first selection signal or the second selection signal in response to the electrical signal, and transmit the first selection signal or the second selection signal to the microcontroller 302.

In practice, one-to-one correspondence between preset electrical signals and selection signals may be set in advance for the voice recognition unit 501 in the voice recognition module 301 in factory. In use, when the user makes a voice, the voice receiver receives the voice signal, converts the voice signal into an electrical signal and transmits the electrical signal to the voice recognition unit 501. The voice recognition module 301 determines whether the electrical signal matches with one of the preset electrical signals, and generates a selection signal corresponding to the electrical signal if the electrical signal matches with one of the preset electrical signals, or generates no selection signal if the electrical signal does not match with any one of the preset electrical signals.

Apparently, in practice, the electrical signals corresponding to the selection signals in the voice recognition unit 501 may not be set in factory but is set by the user, which is not limited herein.

Preferably, a button is further provided on the electronic cigarette body and configured to control the voice receiver 205 in the voice recognition module 301 to be turned on or turned off, which is described in detail hereinafter.

Referring to FIG. 2, a button 206 configured to receive an operation instruction from the user is further provided on the battery module 103 of the electronic cigarette body, and a micro-touch switch 207 is connected to the button 206 and configured to generate a starting signal in response to the operation instruction. The micro-touch switch 207 is electrically connected to the voice receiver 205, such that the voice receiver 205 receives the voice signal in response to the starting signal.

The above arrangement may be adopted to avoid frequent misoperations due to the voice receiver being in a state of receiving the voice signal all the time, and save electric quantity of the battery module.

In the electronic cigarette according to the present disclosure, preferably, a low voltage protection module 304 (see FIG. 3) is further provided in the electronic cigarette body, and a first reminding device (not shown) connected to the low voltage protection module 304 is further provided on an external surface of the electronic cigarette body. The low voltage protection module 304 is configured to control a working state of the first reminding device. The first reminding device may be a liquid crystal screen, an LED light or a generator, which is not limited herein. For example, the first reminding device is an LED light, and the low voltage protection module 304 may control the first reminding device to light up or flicker with a certain frequency in a case that the battery electric quantity of the electronic cigarette is lower than a preset threshold.

In the electronic cigarette according to the present disclosure, preferably, an overcurrent protection module 305 (see FIG. 3) is further provided in the electronic cigarette body, and a second reminding device (not shown) connected to the overcurrent protection module 305 is further provided on an external surface of the electronic cigarette body. The overcurrent protection module 305 is configured to control a working state of the second reminding device. The second reminding device may be a liquid crystal screen, an LED light or a generator, which is not limited herein. For example, the second reminding device is an LED light, and the overcurrent protection module 305 controls the second reminding device to light up or flicker with a certain frequency in a case that a circuit of the electronic cigarette is shorted, and controls the second reminding device to be turned off in a case that the circuit of the electronic cigarette is normal.

Figure 6:
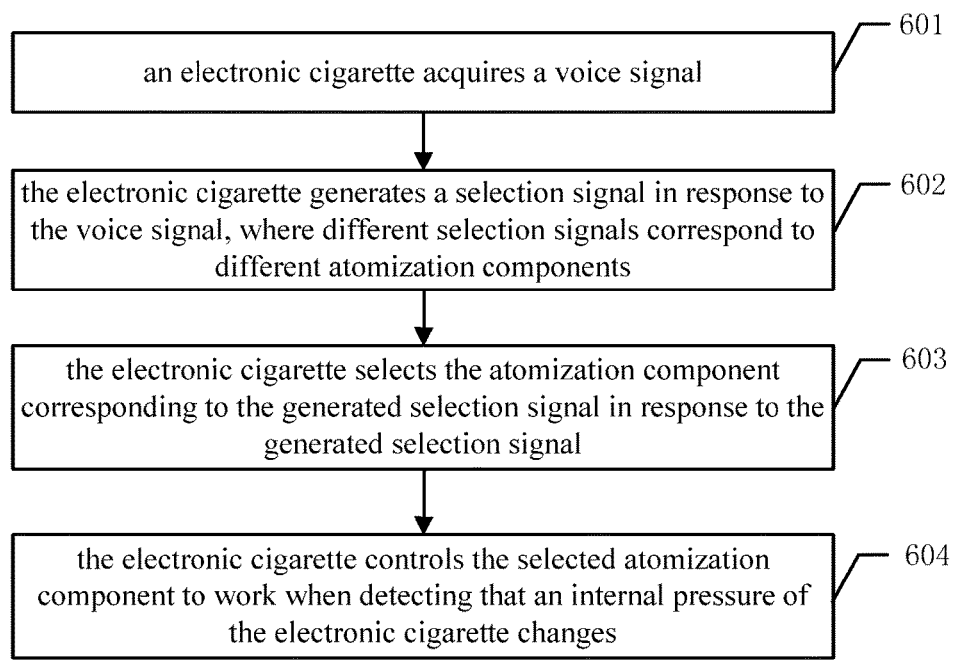
FIG. 6 is a flowchart of a method for controlling atomization of an electronic cigarette according to an embodiment of the present disclosure.

The electronic cigarette according to the embodiments of the present disclosure is described above, and hereinafter a method for controlling atomization of an electronic cigarette is described according to an embodiment of the present disclosure. Referring to FIG. 6, according to an embodiment of the present disclosure, the method for controlling atomization of an electronic cigarette includes step 601 to step 604 in the following.

In step 601, the electronic cigarette acquires a voice signal.

In the embodiment, a voice receiver is provided on the electronic cigarette and is capable of receiving the voice signal. In addition, at least two atomization components are further provided in the electronic cigarette. Each of the atomization components is provided with a separate liquid storage space filled with different cigarette liquid.

In step 602, the electronic cigarette generates a selection signal in response to the voice signal, where different selection signals correspond to different atomization components.

The electronic cigarette may generate more than two selection signals in response to the received voices, where the number of the generated selection signals is equal to the number of atomization components provided in the electronic cigarette, and there is one-to-one correspondence between the atomization components and the selection signals. Alternatively, the number of the selection signals generated in response to the received voices by the electronic cigarette is greater than the number of the atomization components provided in the electronic cigarette, such that each of extra selection signals corresponds to at least two atomization components.

In the embodiment, not any voice signal will cause the electronic cigarette to generate a selection signal. Preset voice signals corresponding to selection signals are set in advance for the electronic cigarette. The electronic cigarette generates a corresponding selection signal in response to the received voice signal only in a case that the received voice signal is consistent with one of the preset voice signals, and generates no selection signal in a case that the received voice signal is not consistent with any of the preset voice signals.

The preset voice signals corresponding to the selection signals may be set in advance in the electronic cigarette in factory. Alternatively, the preset voice signals may be set by the user, which is not limited herein.

In step 603, the electronic cigarette selects the atomization component corresponding to the generated selection signal in response to the generated selection signal.

Correspondence between the atomization components and the selection signals is preset in the electronic cigarette. It should be noted that, in the embodiment, one selection signal may correspond to one atomization component or at least two atomization components. After the electronic cigarette generates a corresponding selection signal in response to the received voice signal, the electronic cigarette selects one or at least two atomization components corresponding to the generated selection signal in response to the selection signal, such that the one or at least two atomization components are in a state ready to work.

For example, in a circuit of the electronic cigarette, one of two electrodes in each atomization component of the electronic cigarette is connected to the battery for supplying power, and the other of the two electrodes is disconnected from the circuit and in an unconnected state. When the electronic cigarette generates a selection signal in response to the received voice signal, the electronic cigarette connects the electrode which is disconnected from the circuit in the atomization component corresponding to the selection signal to the circuit, such that the atomization component is in the state ready to work.

Preferably, the electronic cigarette includes a first atomization component and a second atomization component. The first atomization component is selected in a case that the selection signal is a first selection signal; the second atomization component is selected in a case that the selection signal is a second selection electrical signal; and both the first atomization component and the second atomization component are selected in a case that the selection signal is a third selection electrical signal. In this way, the user can take in cigarette liquid with three flavors even if only two atomization components are provided in the electronic cigarette.

In step 604, the electronic cigarette controls the selected atomization component to work when detecting that an internal pressure of the electronic cigarette changes.

When the user starts to smoke the electronic cigarette, the internal pressure of the electronic cigarette changes. When the electronic cigarette detects that the internal pressure changes, the electronic cigarette controls an internal circuit of the electronic cigarette to start to work, i.e., controlling the selected atomization component to start to work, such that the cigarette liquid in the atomization component starts to be atomized and thus is taken in by the user.

The embodiments of the description are described in a progressive manner, and each embodiment places emphasis on the difference from other embodiments, therefore the embodiments can be referred to from one another for the same or similar parts.

According to the above description of the disclosed embodiments, those skilled in the art can implement or practice the present disclosure. Many changes to these embodiments are apparent for those skilled in the art and general principles defined herein may be implemented in other embodiments without departing from the spirit or scope of the present disclosure. Hence, the present disclosure is not limited to the disclosed embodiments but in accordance with the widest scope in accordance with principles and novel features disclosed herein.

The invention claimed is:

1. An electronic cigarette, comprising:
an electronic cigarette body;
a smoking end, a voice recognition module and an atomization module which are provided in the electronic cigarette body, wherein the voice recognition module is configured to receive a voice signal, convert the voice signal into an electrical signal, determine whether the electrical signal matches with a preset electrical signal, and generate a selection signal corresponding to the electrical signal in a case that the electrical signal matches with the preset electrical signal, the selection signal comprises a first selection signal or a second selection signal, the atomization module comprises at least a first atomization component and a second atomization component, and a first liquid storage space and a second liquid storage space filled with different cigarette liquid are provided in the first atomization component and the second atomization component respectively;
a microcontroller connected to the voice recognition module, wherein the microcontroller is configured to be connected to the first atomization component in response to the first selection signal or connected to the second atomization component in response to the second selection signal; and
an airflow sensor and a battery module which are provided in the electronic cigarette body, wherein the air flow sensor is connected to the microcontroller and configured to generate a first pulse signal, and the battery module is configured to supply power to the microcontroller, the first atomization component and the second atomization component; and wherein
the microcontroller is further configured to generate a first control signal in response to the first pulse signal, and the atomization component, which is connected to the microcontroller, is configured to atomize the cigarette liquid in the liquid storage space corresponding to the atomization component in response to the first control signal.

2. The electronic cigarette according to claim 1, wherein
the voice recognition module is further configured to generate a third selection signal corresponding to the electrical signal in a case that the electrical signal matches with the preset electrical signal; and
the microcontroller is further configured to be connected to both the first atomization component and the second atomization component in response to the third selection signal.

3. The electronic cigarette according to claim 1, wherein
the first atomization component further comprises a first heating wire component configured to atomize the cigarette liquid in the first liquid storage space;
the second atomization component further comprises a second heating wire component configured to atomize the cigarette liquid in the second liquid storage space; and
two ends of the first liquid storage space are respectively adjacent to two ends of the second liquid storage space, wherein the first liquid storage space and the second liquid storage space are arranged in a parallel and side by side manner in the electronic cigarette body.

4. The electronic cigarette according to claim 3, wherein the first atomization component further comprises:
a first atomizer bracket, wherein a first thread segment is provided at an end of the first atomizer bracket close to the battery module, a first matching thread is provided at an end of the battery module close to the first atomizer bracket, and the first atomizer bracket and the battery module are detachably connected to each other by cooperation between the first thread segment and the first matching thread; and the first liquid storage space is arranged on the first atomizer bracket;

the second atomization component further comprises:

a second atomizer bracket, wherein a second thread segment is provided at an end of the second atomizer bracket close to the battery module, a second matching thread is provide at an end of the battery module close to the second atomizer bracket, and the second atomizer bracket and the battery module are detachably connected to each other by cooperation between the second thread segment and the second matching thread; and the second liquid storage space is arranged on the second atomizer bracket.

5. The electronic cigarette according to claim 1, wherein the voice recognition module comprises a voice receiver and a voice recognition unit;

the voice receiver is configured to receive the voice signal and convert the received voice signal into the electrical signal; and the voice recognition unit is configured to determine whether the electrical signal matches with the preset electrical signal, generate the first selection signal or the second selection signal in response to the electrical signal in a case that the electrical signal matches with the preset electrical signal, and transmit the first selection signal or the second selection signal to the microcontroller.

6. The electronic cigarette according to claim 5, wherein the battery module further comprises:

a button configured to receive an operation instruction from a user; and a micro-touch switch connected to the button and configured to generate a starting signal in response to the operation instruction, wherein the micro-touch switch is connected to the voice receiver to control the voice receiver to receive the voice signal in response to the starting signal.

7. The electronic cigarette according to claim 1, wherein a low voltage protection module is further provided in the electronic cigarette body;

a first reminding device connected to the low voltage protection module is further provided on an external surface of the electronic cigarette body; and the low voltage protection module is configured to control a working state of the first reminding device.

8. The electronic cigarette according to claim 1, wherein an overcurrent protection module is further provided in the electronic cigarette body;

a second reminding device connected to the overcurrent protection module is further provided on an external surface of the electronic cigarette body; and the overcurrent protection module is configured to control a working state of the second reminding device.

9. A method for controlling atomization of an electronic cigarette, wherein at least two atomization components are provided in the electronic cigarette, each of the atomization components is provided with a separate liquid storage space, the different liquid storage spaces of the at least two atomization components are filled with different cigarette liquid, and the method comprises:

acquiring, by the electronic cigarette, a voice signal, and converting the voice signal into an electrical signal;

determining by the electronic cigarette whether the electrical signal matches with a preset electrical signal, and generating a selection signal corresponding to the electrical signal in a case that the electrical signal matches with the preset electrical signal, wherein different selection signals correspond to different atomization components;

selecting, by the electronic cigarette, the atomization component corresponding to the generated selection signal in response to the generated selection signal; and controlling, by the electronic cigarette, the selected atomization component to work when detecting that an internal pressure of the electronic cigarette changes.

10. The method for controlling atomization of an electronic cigarette according to claim 9, wherein the electronic cigarette comprises a first atomization component and a second atomization component; and the selecting, by the electronic cigarette, the atomization component corresponding to the generated selection signal in response to the generated selection signal comprises:

selecting the first atomization component in a case that the selection signal is a first selection signal;

selecting the second atomization component in a case that the selection signal is a second selection electrical signal; and selecting both the first atomization component and the second atomization component in a case that the selection signal is a third selection electrical signal.

11. The electronic cigarette according to claim 1, wherein each of the first atomization component and the second atomization component comprises two electrodes;

one of the two electrodes is connected to the battery module;

when the first or the second atomization component is not connected to the microcontroller, the other one of the two electrodes of the first or the second atomization component is disconnected from a circuit inside the electronic cigarette; and the microcontroller being configured to be connected to the first atomization component in response to the first selection signal or connected to the second atomization component in response to the second selection signal comprises:

connecting the electrode, which is disconnected from the circuit, of the first atomization component corresponding to first the selection signal to the circuit, or connecting the electrode, which is disconnected from the circuit, of the second atomization component corresponding to second the selection signal to the circuit.

12. The electronic cigarette according to claim 2, wherein each of the first atomization component and the second atomization component comprises two electrodes;

one of the two electrodes is connected to the battery module;

when the first or the second atomization component is not connected to the microcontroller, the other one of the two electrodes of the first or the second atomization component is disconnected from a circuit inside the electronic cigarette; and the microcontroller being further configured to be connected to both the first atomization component and the second atomization component in response to the third selection signal comprises:

connecting the electrode, which is disconnected from the circuit, of the first atomization component to the circuit, and connecting the electrode, which is disconnected from the circuit, of the second atomization component to the circuit.

\